United States Patent
Mycynek

(10) Patent No.: US 6,246,431 B1
(45) Date of Patent: Jun. 12, 2001

(54) DIGITAL TELEVISION SYSTEM FOR REDUCING CO-CHANNEL INTERFERENCE IN 8 MHZ CHANNELS

(75) Inventor: Victor G. Mycynek, Des Plaines, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/236,994

(22) Filed: Jan. 26, 1999

(51) Int. Cl.[7] .............................. H04N 5/38; H04N 5/21
(52) U.S. Cl. .............................. 348/21; 348/614; 348/611
(58) Field of Search .............................. 348/21, 607, 608, 348/611, 614, 704, 724, 725; 375/346, 350, 348, 349; H04N 5/38, 5/21

(56) References Cited

U.S. PATENT DOCUMENTS

| | | |
|---|---|---|
| 5,087,975 | 2/1992 | Citta et al. . |
| 5,583,889 | 12/1996 | Citta et al. . |
| 5,802,241 | 9/1998 | Oshima . |
| 5,969,751 | * 10/1999 | Lee .......................................... 348/21 |
| 5,973,725 | * 10/1999 | Lee .......................................... 348/21 |

OTHER PUBLICATIONS

International Search Report in PCT/US00/18489 dated Oct. 18, 2000.

* cited by examiner

Primary Examiner—Sherrie Hsia

(57) ABSTRACT

A linear filter for use in 8 MHZ television broadcast systems is provided having a frequency response which includes a notch corresponding to a television picture carrier fpix, a notch corresponding to approximately a television color subcarrier fcs, and a notch corresponding to approximately a television sound carrier fs. Accordingly, the linear filter substantially reduces co-channel interference in a digital signal received by a digital television.

40 Claims, 2 Drawing Sheets

DIGITAL TELEVISION SYSTEM FOR REDUCING CO-CHANNEL INTERFERENCE IN 8 MHZ CHANNELS

TECHNICAL FIELD OF THE INVENTION

The present invention is directed to reducing co-channel interference in a television system having 8 MHZ analog and digital channels.

BACKGROUND OF THE INVENTION

Simulcast broadcasting is a technique which has been proposed in the U.S. and other countries in order to provide digital television services (e.g., high definition television) without obsoleting analog receivers currently in use. Simulcast broadcasting refers to the simultaneous transmission of program material encoded in two different formats over respective television channels. Thus, for example, in the U.S., a particular program may be encoded in NTSC format for transmission over a first 6 MHZ television channel, and the same or different program may be encoded in a digital format for transmission over a second 6 MHZ television channel. Therefore, viewers equipped with NTSC receivers would be able to receive and reproduce the program encoded in the NTSC format by tuning to the first channel, while viewers equipped with digital receivers would be able to receive and reproduce the program encoded in the digital format by tuning to the second channel.

It is generally assumed that NTSC and digital programs will be allocated to different channels in any given service area. However, it is quite possible that an NTSC program transmitted in one service area will be allocated to the same channel as a digital program transmitted in a nearby service area. If so, the NTSC program and the digital program could interfere producing co-channel interference.

NTSC co-channel interference with a received digital signal is of particular concern due to the relatively large picture and sound carriers and color sub-carrier characterizing an NTSC transmission. NTSC co-channel interference could either reduce the performance of a digital receiver or render the digital receiver incapable of reproducing any viewable image at all.

U.S. Pat. No. 5,087,975 discloses various embodiments of a comb filter which are arranged to reduce NTSC co-channel interference in a digital receiver used in television broadcast system having 6 MHZ channels. For example, a comb filter is disclosed in FIG. 4B of this patent and includes a summer 144 having first and second inputs of the same polarity. The first input receives an input signal directly, and the second input receives the input signal through a delay circuit 142. The delay circuit 142 imposes a six symbol delay on the input signal in order to produce the filter response shown in FIG. 6 of this '975 patent. As can be seen from FIG. 6, two of the notches of the comb filter response substantially coincide with the picture carrier and the color subcarrier of the NTSC transmitted television signal in order to reduce NTSC co-channel interference.

As another example, a comb filter is disclosed in FIG. 13 of the '975 patent and includes a summer 202 having first and second inputs of different polarity. The first input receives an input signal directly, and the second input receives the input signal through a delay circuit 200. The delay circuit 200 imposes a twelve symbol delay on the input signal in order to produce the filter response shown in FIG. 15. As can be seen from FIG. 15, three of the notches of the comb filter response substantially coincide with the picture and sound carriers and the color subcarrier of the NTSC transmitted television signal in order to reduce NTSC co-channel interference.

This system operates very well to reduce NTSC co-channel interference. However, in a television system having 8 MHZ channels, such as the 8 MHZ channels used in a PAL television system, where co-channel interference arises in much the same way as NTSC co-channel interference does in the 6 MHZ NTSC television system, the system disclosed in the '975 patent operates poorly to reduce co-channel interference. This poor operation results because the picture and sound carriers and the color subcarrier of the analog television signal transmitted in the 8 MHZ channel have frequencies which are different than the frequencies of the picture and sound carriers and the color subcarrier of the 6 MHZ NTSC transmitted television signal. Therefore, the notches of the comb filters disclosed in the '975 patent are not appropriate for an 8 MHZ transmitted television signal.

In an effort to reduce co-channel interference in a digital receiver operating in an 8 MHZ television system, it has been suggested that the 8 MHZ digital channel be shifted by a suitable amount with respect to the corresponding 8 MHZ analog channel in an attempt to align the notches of the comb filter response with the picture and sound carriers and the color subcarrier of that corresponding 8 MHZ analog television signal. However, the notches of the comb filter response do not adequately align with the picture and sound carriers and the color subcarrier of the transmitted analog television signal by merely shifting the digital channel. Moreover, shifting of the digital channel results in the digital channel spilling over into the adjacent analog channel causing undue interference between the digital channel and the adjacent analog channel.

Accordingly, it has also been suggested to raise the symbol rate of the digital system transmitting into 8 MHZ channels. This symbol rate could be raised from the symbol rate of 10.76 MHZ for a 6 MHZ channel to a frequency as high as 14.34 MHZ for an 8 MHZ channel. Raising the symbol rate toward 14.34 MHZ has the effect of increasing the separation of the notches of the comb filter response. Raising the symbol rate from 10.76 MHZ, however, does not adequately align the notches of the comb filter response with the picture and sound carriers and the color subcarrier of the transmitted 8 MHZ analog television signal. Moreover, even a moderate increase in the symbol rate from 10.76 MHZ shifts the notch positions enough to require a shift of the digital signal downward in frequency in order to re-align the notches with the picture and sound carriers and the color subcarrier of the transmitted co-channel 8 MHZ analog television signal. This downward shift in the digital spectrum, however, results in a spill-over of the digital channel into the lower adjacent analog channel producing an undesired interference between the digital and lower adjacent analog channels that cannot be easily reduced.

In order to maintain the symbol rate as high as possible, it has further been suggested to provide the inputs of the summer 202 disclosed in the aforementioned '975 patent with the same polarity and to shift the digital channel. However, the notches of the comb filter response again cannot be made to align adequately with the picture and sound carriers and the color subcarrier of the transmitted 8 MHZ television signal.

The present invention is directed to an arrangement which adequately reduces co-channel interference from an 8 MHZ analog television signal in a digital television receiver.

SUMMARY OF THE INVENTION

In accordance with one aspect of the present invention, a digital television receiver comprises a tuner and a filter. The tuner is arranged to tune to an 8 MHZ digital transmission signal transmitted in a selected television channel, and co-channel interference may be produced in the selected television channel by an 8 MHZ analog transmission signal. The filter includes a nine symbol delay and is arranged to substantially reduce the co-channel interference produced by the 8 MHZ analog transmission signal.

In accordance with another aspect of the present invention, a method of processing an 8 MHZ digital television signal transmitted in a selected television channel comprises the following steps: a) receiving the 8 MHZ digital television signal transmitted in the selected television channel, wherein co-channel interference may be produced in the selected television channel by an 8 MHZ analog television signal; and b) filtering the received 8 MHZ digital television signal with a filter response having a notch arranged to substantially reduce the co-channel interference produced by the 8 MHZ analog television signal, such that the notch is due to a nine symbol delay.

In accordance with yet another aspect of the present invention, a method of receiving a television transmission signal over a selected 8 MHZ television channel comprises the following steps: a) receiving the television transmission signal having respective Nyquist slopes at the lower and upper edges of the 8 MHZ selected television channel, the television transmission signal being formed by a suppressed carrier signal modulated with an N-level digitally encoded signal, the N-level digitally encoded data being provided at a symbol rate of fs, the carrier signal being substantially coincident with a center frequency of the Nyquist slope at the lower edge of the selected 8 MHZ television channel and having a frequency fs/18 below a frequency of a picture carrier of an analog television signal; and b) using a symbol rate fs to recover the N-level digitally encoded signal.

In accordance with still another aspect of the present invention, an 8 MHZ digital television transmitter comprises a pre-coder and a modulator. The pre-coder is arranged to pre-code a digital video signal provided at a symbol rate fs, wherein the pre-coder includes a delay of 9/fs. The modulator is arranged to modulate a carrier signal with the pre-coded digital video signal and to transmit the modulated carrier signal over an 8 MHZ channel.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
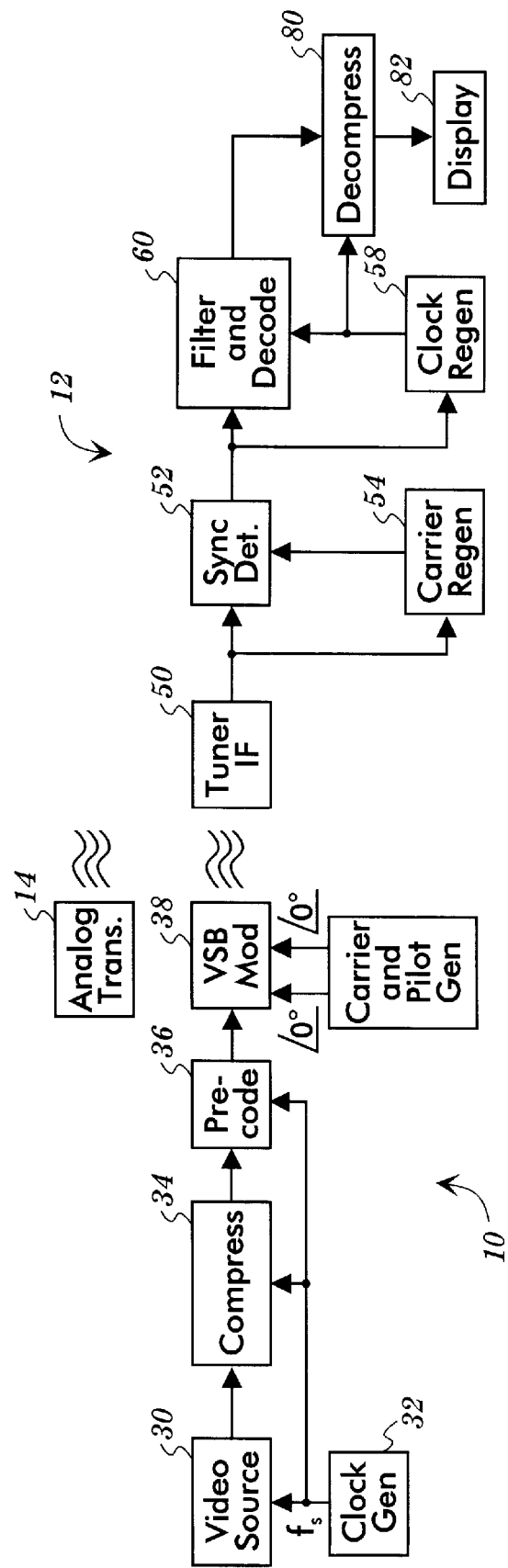
FIG. 1 is a block diagram of a television signal transmission system constructed in accordance with the present invention.

A digital transmitter 10, which is illustrated in FIG. 1, broadcasts a digital encoded signal over a selected 8 MHZ television channel for reception and reproduction by a corresponding digital receiver 12 tuned to the selected channel. At the same time, an analog (e.g., PAL) transmitter 14 broadcasts an encoded signal over the same 8 MHZ channel in a nearby television service area. Depending on various factors including its physical location, the digital receiver 12 may thus receive an undesired interfering component of considerable strength from the analog transmitter 14 in addition to the desired signal from the digital transmitter 10. Because the undesired interfering signal is transmitted in the same channel as the desired digital signal, the resulting interference is commonly referred to as co-channel interference.

The co-channel interfering signal in the digital receiver 12 especially poses a problem in the case where an all digital transmission standard is employed. In particular, if the co-channel interfering signal is of sufficient strength, the ability of the digital receiver 12 to reproduce an image of any quality may be completely compromised. Moreover, this impairment of the digital receiver 12 may arise quite abruptly with variations in the strength of the interfering analog co-channel signal. By contrast, variations in the strength of an interfering digital co-channel signal causes gradual changes in the signal-to-noise performance of an analog receiver.

Figure 2:
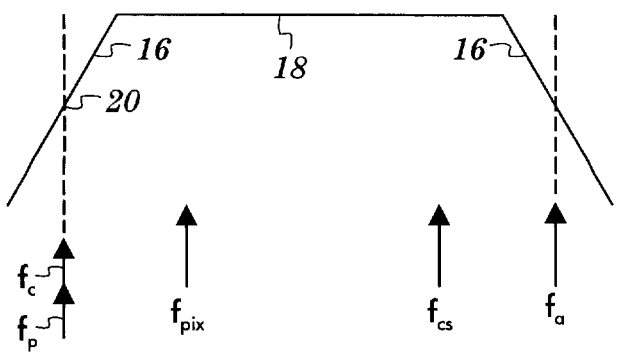
FIG. 2 is a graph illustrating the spectrum of an 8 MHZ Digital television channel in accordance with the present invention.

As is well known in the art, the spectrum of the interfering analog co-channel signal occupies an 8 MHZ television channel and includes a picture (i.e., luma) component modulated on a picture carrier fpix, a color (i.e., chroma) component modulated on a color subcarrier fcs, and a sound (i.e, audio) component modulated on a sound carrier fa. As shown in FIG. 2, the picture carrier fpix at RF is about 1.25 MHZ from one end of the channel, the color subcarrier fcs at RF is spaced about 4.434 MHZ from the picture carrier fpix, and the sound carrier fa is spaced about 6.50 MHZ from the picture carrier fpix or 0.25 MHZ from the other end of the channel.

FIG. 2 also illustrates the spectrum of a digital transmission channel according to the present invention. The channel occupies 8 MHZ (corresponding to the analog transmission channel) through which a VSB signal is transmitted as illustrated. More particularly, a respective Nyquist slope 16 is provided at each edge of the channel with a substantially flat response portion 18 extending therebetween. A suppressed carrier fc for the channel is selected to have a frequency near a center frequency 20 of the Nyquist slope 16 at the lower edge of the channel. For example, the suppressed carrier fc for the channel may be selected to be 414 KHz above the lower edge of the channel. Accordingly, the channel comprises a vestigial sideband portion including the frequencies along the Nyquist slope 16 at the lower edge of the channel and a single sideband portion including the remaining frequencies up to the upper edge of the channel.

It will be appreciated that modulation of the carrier fc results in single sideband components at all frequencies except at the frequencies near the carrier itself. Accordingly, an in-phase pilot fp is preferably inserted in the channel at the frequency of the carrier fc in order to facilitate regeneration of the carrier in the receiver, although a quadrature pilot could also be used for this purpose.

The symbol rate of the data to be transmitted through the channel, where each symbol represents two bits, is defined as fs and, in an 8 MHZ channel, may be optimally set at about 14.34 MHZ.

As shown in FIG. 1, the digital transmitter 10 comprises a video source 30 which receives a clock signal fs from a clock generator 32 in order to provide a digital video signal.

The video signal developed by the video source 30 is applied to a video compressor 34 which compresses the video signal sufficiently to permit its transmission through an 8 MHZ television channel. (At this point, any data signal may be substituted for the digital video bit stream.) The compressed video signal is then coupled to a pre-coder 36, which will be described below in connection with FIG. 3A, and therefrom to a VSB modulator 38 for transmission through the channel.

Both the video compressor 34 and the pre-coder 36 are operated in response to the clock signal fs from the clock generator 32. The VSB modulator 38 is supplied with a carrier having a nominal frequency of approximately fs/18 less than the corresponding analog picture carrier frequency fpix. Also, an in-phase pilot component of the carrier signal is applied to the VSB modulator 38 in order to facilitate re-generation of the carrier in the digital receiver 12. The frequencies of the clock and carrier signals, of course, can be slightly adjusted from the nominal values. The video signal is transmitted as a sequence of N-level data symbols, with the transmission preferably being effected by the VSB modulator 38 in the form of a suppressed carrier, VSB signal with the clock or symbol rate equal to, or slightly less than, 8/6(10.76 MHZ) or 14.34 MHZ.

The digital receiver 12 includes a tuner and IF stage 50 tuned to a selected 8 MHZ television channel over which a digital signal is transmitted. The tuned digital signal, together with co-channel analog signal broadcast by an analog transmitter in a nearby television service area, are converted to an IF frequency in the tuner and IF stage 50 whose output is coupled to the input of a synchronous detector 52. The output of the tuner and IF stage 50 is also coupled to a carrier regenerator 54 which is responsive to the received pilot signal for regenerating a signal having a frequency equal to the digital suppressed carrier fc. The carrier regenerator 54 preferably comprises a narrow band frequency and phase locked loop circuit. The regenerated carrier is applied to a second input of the synchronous detector 52. The output of the synchronous detector 52 thus includes the desired digital component and the undesired analog co-channel interference substantially at the picture and sound carriers and the color subcarrier.

Figure 4:
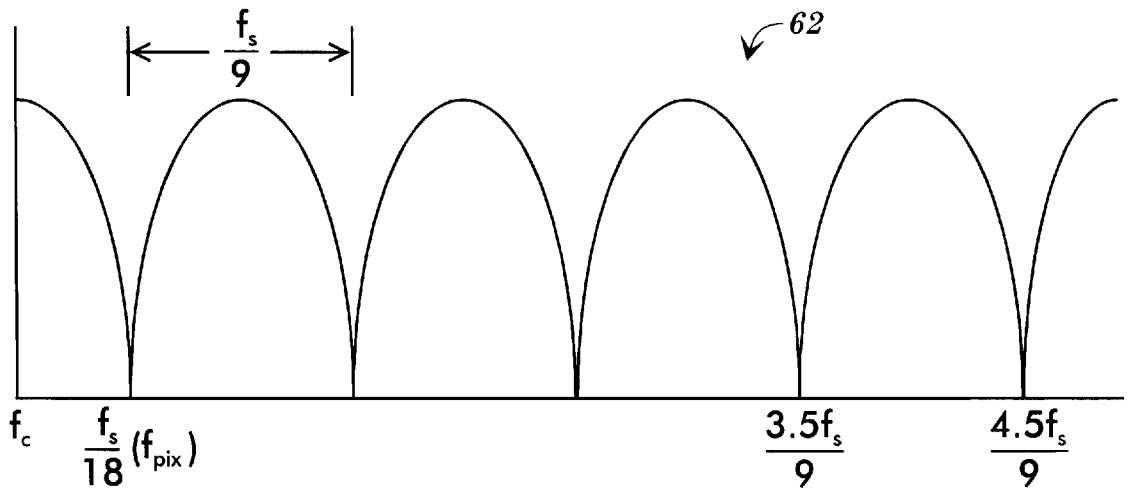

The output of the synchronous detector 52 is coupled to a clock circuit 58, which regenerates the clock signal fs, and to the input of a filter and decoder stage 60. The filter and decoder stage 60 comprises a linear filter having a response represented by a curve 62 which is shown in FIG. 4. The major contributor to the analog co-channel interference is the relatively large picture carrier, and the next major contributor to the analog co-channel interference is the somewhat smaller color subcarrier. The sound carrier contributes to analog co-channel interference to a lesser extent. The linear filter is arranged to substantially reduce interference at these picture and sound carrier and color subcarrier frequencies. Accordingly, the response of the linear filter includes a notch at 0.5fs/9, which corresponds closely to the picture carrier fpix, a notch at 3.5fs/9, which corresponds closely to approximately the color subcarrier fcs, and a notch at 4.5fs/9, which corresponds to approximately the sound carrier fs. The spacing between notches is fs/9.

Figure 3A:
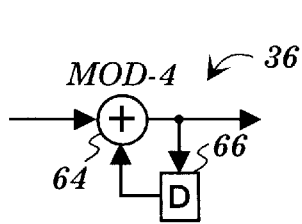
FIGS. 3A and 3B are block diagrams of complementary pre-coder and filter circuits which may be used in the transmitter and receiver, respectively, of FIG. 1 in accordance with the present invention; and, FIG. 4 is a graph illustrating the response of the filter of FIG. 3B to co-channel interference.
Figure 3B:
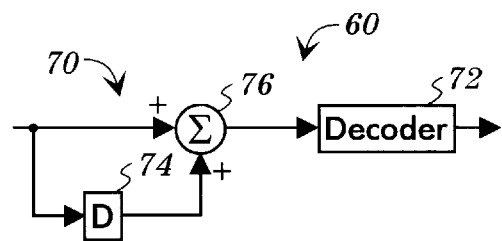

An exemplary embodiment of the pre-coder 36 and an exemplary embodiment of the filter and decoder stage 60 are illustrated in FIGS. 3A and 3B, respectively. The pre-coder 36 comprises a feedback circuit having a modulo-4 adder 64 which receives the output from the video compressor 34 at a first input. The output of the modulo-4 adder 64 is fed back through a delay circuit 66 characterized by a delay corresponding to 9/fs (i.e., 9 clock cycles at the symbol irate fs).

The output of the delay circuit 66 is applied to the second input of the modulo-4 adder 64 which, therefore, effectively adds the feedback signal from the delay circuit 66 to the input signal in modulo-4 fashion.

The filter and decoder stage 60 preferably comprises a comb filter 70 and a decoder 72. The comb filter 70 is a feed forward circuit whose input is coupled to the input of a delay circuit 74 and to one input of a summer 76. The output of the delay circuit 74 is coupled to the other input of the summer 76. The inputs of the summer 76 have the same polarity. Accordingly, the summer 76 adds the delayed signal to the input signal. The delay circuit 74 is characterized by a delay corresponding to 9/fs. The summer 76 provides an output to the decoder 72 which decodes each transmitted data element in order to recover the corresponding bits.

The frequency response of the comb filter 70 of FIG. 3B is illustrated generally in FIG. 4. By setting the symbol rate fs at 14.140625 MHZ, the response of the comb filter 70 will be seen to include a notch at 0.5fs/9, which corresponds closely to the analog picture carrier fpix, a notch at 3.5fs/9, which corresponds to approximately the analog color subcarrier fcs, and a notch at 4.5fs/9, which corresponds to approximately the analog sound carrier fs. This reduction of the symbol rate from its maximum value (of 8/610.76 MHZ) reduces data throughput only slightly and achieves very adequate co-channel interference reduction.

Alternatively, by setting the symbol rate fs at approximately 14.343750 MHZ (i.e., the full data rate for an 8 MHZ channel), the response of the comb filter 70 will be seen to include notches which are sufficiently close to 0.5fs/9, 3.5fs/9, and 4.5fs/9 to adequately reduce co-channel interference corresponding to the analog picture carrier fpix, the analog color subcarrier fcs, and the analog sound subcarrier fs. In addition, performance at 14.343750 MHZ can be improved at least somewhat by shifting the digital channel higher by up to about 40 KHz. The spill over of the digital channel into an adjacent analog channel caused by this shift of the digital channel is insufficient to interfere with the adjacent analog channel to any significant extent.

As shown in FIG. 1, the output of the filter and decoder stage 60 is coupled to a decompression circuit 80 for reconstructing a video signal representing the original video source signal. The reconstructed video signal is applied to a display 82 for displaying the reconstructed image.

In absence of co-channel interference from an analog transmitter, the comb filter 70 may be bypassed and the output of the synchronous detector 52 may be directly processed by the decoder 72.

Certain modifications of the present invention have been discussed above. Other modifications will occur to those practicing in the art of the present invention. For example, current digital systems are similar to the system disclosed by Citta, et al. in U.S. Pat. No. 5,583,889. In accordance with the teachings of this '889 patent, the transmitter may include (i) a Reed Solomon encoder for forward error correction coding, (ii) a byte interleaver which reorders the data bytes throughout a frame to reduce the susceptibility of the data transmission and reception system to burst noise, (iii) a symbol interleaver which provides, for example, two output bit streams $X_1$ and $X_2$ at the symbol rate, (iv) a pre-coder and a trellis encoder which convert each pair of corresponding bits in the bit streams $X_1$ and $X_2$ to a set of three bits, and (v) a symbol mapper which maps each set of three bits to a multi-level symbol.

The pre-coder in the system disclosed in the '889 patent, like the pre-coder 36, includes a delay element, and this delay element is preferably set to a nine symbol delay in accordance with the present invention. The trellis encoder in the system disclosed in the '889 patent includes two delay elements, and each of these delay elements is also preferably set to a corresponding nine symbol delay in accordance with the present invention.

Moreover, in the case where a trellis encoder is used, the decoder 72 may be a Viterbi decoder as disclosed in the '889 patent.

Furthermore, the present invention is described above in terms of reducing co-channel interference in a digital television receiver caused by an analog television signal. The present invention is also useful in reducing interference in any type of data receiver caused by an analog television signal.

In addition, once the symbol clock fs is regenerated, the symbol clock fs can be used in the receiver to digitize the received signal so that the digitized received signal can be digitally processed.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A digital television receiver comprising:
   a tuner arranged to tune to an 8 MHZ digital transmission signal transmitted in a selected television channel, wherein co-channel interference is produced in the selected television channel by an 8 MHZ analog transmission signal; and,
   a filter, wherein the filter includes a nine symbol delay, and wherein the filter is arranged to substantially reduce the co-channel interference produced by the 8 MHZ analog transmission signal.

2. The receiver of claim 1 wherein the filter is arranged to provide a notch corresponding to a carrier or subcarrier of the analog transmission signal.

3. The receiver of claim 1 wherein the filter is arranged to provide a notch corresponding to a picture carrier of the analog transmission signal.

4. The receiver of claim 3 wherein the digital transmission signal is a carrier signal modulated with a digital television signal provided at a symbol rate fs, wherein the carrier signal has a frequency, and wherein the filter is arranged to provide the notch at about fs/18 from, the frequency of the carrier signal.

5. The receiver of claim 1 wherein the filter is arranged to provide a notch corresponding to a color subcarrier of the analog transmission signal.

6. The receiver of claim 5 wherein the digital transmission signal is a carrier signal modulated with a digital television signal provided at a symbol rate fs, wherein the carrier signal has a frequency, and wherein the filter is arranged to provide the notch at about 3.5fs/9 from the frequency of the carrier signal.

7. The receiver of claim 1 wherein the filter is arranged to provide a notch corresponding to a sound carrier of the analog transmission signal.

8. The receiver of claim 7 wherein the digital transmission signal is a carrier signal modulated with a digital television signal provided at a symbol rate fs, wherein the carrier signal has a frequency, and wherein the filter is arranged to provide the notch at about 4.5fs/9 from the frequency of the carrier signal.

9. The receiver of claim 1 wherein the digital transmission signal is a carrier signal modulated with a digital television signal provided at a symbol rate fs, and wherein the filter is arranged to provide notches separated by fs/9.

10. The receiver of claim 1 wherein the co-channel interference is produced in the selected television channel by a picture carrier and by a color sub-carrier of the analog transmission signal, and wherein the filter is arranged to substantially reduce the co-channel interference produced by the picture carrier and the color subcarrier of the analog transmission signal.

11. The receiver of claim 10 wherein the digital transmission signal is a carrier signal modulated with a digital television signal provided at a symbol rate fs, wherein the carrier signal has a frequency, and wherein the filter is arranged to provide notches at about fs/18 and 3.5fs/9 from the frequency of the carrier signal.

12. The receiver of claim 10 wherein the digital transmission signal is a carrier signal modulated with a digital television signal provided at a symbol rate fs, wherein the carrier signal has a frequency, and wherein the filter is arranged to provide notches separated by fs/9.

13. The receiver of claim 10 wherein the filter has a response, and wherein the response has notches corresponding to the picture carrier and the color subcarrier of the analog transmission signal.

14. The receiver of claim 1 wherein the digital transmission signal is a carrier signal modulated with a digital television signal provided at a symbol rate fs, wherein the analog transmission signal has a picture carrier, wherein the filter is arranged to produce a first notch corresponding to the picture carrier, and wherein the filter is arranged to produce a second notch fs/3 from the first notch.

15. The receiver of claim 1 wherein the digital transmission signal is a carrier signal modulated with a digital television signal provided at a symbol rate fs, wherein the analog transmission signal has a picture carrier, wherein the filter is arranged to produce a first notch corresponding to the picture carrier, wherein the filter is arranged to produce a second notch at fs/3 from the first notch, and wherein the filter is arranged to produce a third notch at fs/9 from the second notch.

16. The receiver of claim 1 wherein the digital transmission signal is a carrier signal modulated with a digital television signal provided at a symbol rate fs, wherein the analog transmission signal has a picture carrier, wherein the filter is arranged to produce a first notch corresponding to the picture carrier, and wherein the filter is arranged to produce a second notch at 4fs/9 from the first notch.

17. The receiver of claim 1 wherein the filter is a comb filter.

18. The receiver of claim 1 wherein the filter is a comb filter comprising a summer having first and second inputs and an output, wherein the first input is arranged to receive a data symbol, wherein the first and second inputs have the same polarity, and wherein the delay is coupled between the first and second inputs.

19. The receiver of claim 1 wherein the filter is a comb filter, wherein the comb filter is driven by a clock f, and wherein the delay is 9/f.

20. The receiver of claim 1 wherein the filter is a comb filter having the nine symbol delay, wherein the digital transmission signal is a carrier signal modulated with a digital television signal provided at a symbol rate fs, and wherein the symbol rate fs is substantially equal to 14.140625 MHZ.

21. The receiver of claim 1 wherein the filter is a comb filter having the nine symbol element delay, wherein the digital transmission signal is a carrier signal modulated with a digital television signal provided at a symbol rate fs, and wherein the symbol rate fs is substantially equal to 14.343750 MHZ.

22. The receiver of claim 21 wherein the selected television channel is shifted.

23. A method of processing an 8 MHZ digital television signal transmitted in a selected television channel comprising the following steps:

receiving the 8 MHZ digital television signal transmitted in the selected television channel, wherein co-channel interference is produced in the selected television channel by an 8 MHZ analog television signal; and, filtering the received 8 MHZ digital television signal with a filter response having a notch arranged to substantially reduce the co-channel interference produced by the 8 MHZ analog television signal, wherein the notch is due to a nine symbol delay.

24. The method of claim 23 wherein the filtering step comprises the step of filtering the received digital television signal with a filter response having a notch corresponding to a carrier or subcarrier of the analog television signal.

25. The method of claim 23 wherein the filtering step comprises the step of filtering the received digital television signal with a filter response having a notch corresponding to a picture carrier of the analog television signal.

26. The method of claim 25 wherein the digital television signal is provided at a symbol rate fs and is modulated onto a carrier signal, wherein the carrier signal has a frequency, and wherein the filtering step comprises the step of filtering the received digital television signal with a filter response having a notch at about fs/18 from the frequency of the carrier signal.

27. The method of claim 23 wherein the filtering step comprises the step of filtering the received digital television signal with a filter response having a notch corresponding to a color subcarrier of the analog television signal.

28. The method of claim 27 wherein the digital television signal is provided at a symbol rate fs and is modulated onto a carrier signal, wherein the carrier signal has a frequency, and wherein the filtering step comprises the step of filtering the received digital television signal with a filter response having a notch at about 3.5fs/9 from the frequency of the carrier signal.

29. The method of claim 23 wherein the filtering step comprises the step of filtering the received digital television signal with a filter response having a notch corresponding to a sound carrier of the analog television signal.

30. The method of claim 29 wherein the digital television signal is provided at a symbol rate fs and is modulated onto a carrier signal, wherein the carrier signal has a frequency, and wherein the filtering step comprises the step of filtering the received digital television signal with a filter response having a notch at about 4.5fs/9 from the frequency of the carrier signal.

31. The method of claim 23 wherein the digital television signal is provided at a symbol rate fs, and wherein the filtering step comprises the step of filtering the received digital television signal with a filter response having notches separated by fs/9.

32. The method of claim 23 wherein the filtering step comprises the step of filtering the received digital television signal with a filter response having notches corresponding to a picture carrier and a color subcarrier of the analog television signal.

33. The method of claim 23 wherein the filtering step comprises the step of filtering the received digital television signal with a filter response having notches corresponding to a picture carrier and a sound carrier of the analog television signal.

34. The method of claim 23 wherein the filtering step comprises the step of filtering the received digital television signal with a filter response having notches corresponding to a color subcarrier and a sound carrier of the analog television signal.

35. The method of claim 23 wherein the filtering step comprises the step of filtering the received digital television signal with a filter response having notches corresponding to a color subcarrier, a picture carrier and a sound carrier of the analog television signal.

36. A method of receiving a television transmission signal over a selected 8 MHZ television channel comprising the following steps:

a) receiving the television transmission signal having respective Nyquist slopes at the lower and upper edges of the 8 MHZ selected television channel, wherein the television transmission signal is formed by a suppressed carrier signal modulated with an N-level digitally encoded signal, wherein the N-level digitally encoded signal is provided at a symbol rate of fs, and wherein the carrier signal is substantially coincident with a center frequency of the Nyquist slope at the lower edge of the selected 8 MHZ television channel and has a frequency fs/18 below a frequency of a picture carrier of an analog television signal; and, b) using a symbol rate fs to recover the N-level digitally encoded signal.

37. The method of claim 36 wherein the symbol rate fs is substantially equal to 14.140625 MHZ.

38. The method of claim 36 wherein the symbol rate fs is substantially equal to 14.343750 MHZ.

39. The method of claim 38 wherein the selected television channel is shifted.

40. An 8 MHZ digital television transmitter comprising:

a pre-coder arranged to pre-code a digital video signal provided at a symbol rate fs, wherein the pre-coder includes a delay of 9/fs; and, a modulator arranged to modulate a carrier signal with the pre-coded digital video signal and to transmit the modulated carrier signal over an 8 MHZ channel.

* * * * *